United States Patent Office 2,921,395
Patented Jan. 19, 1960

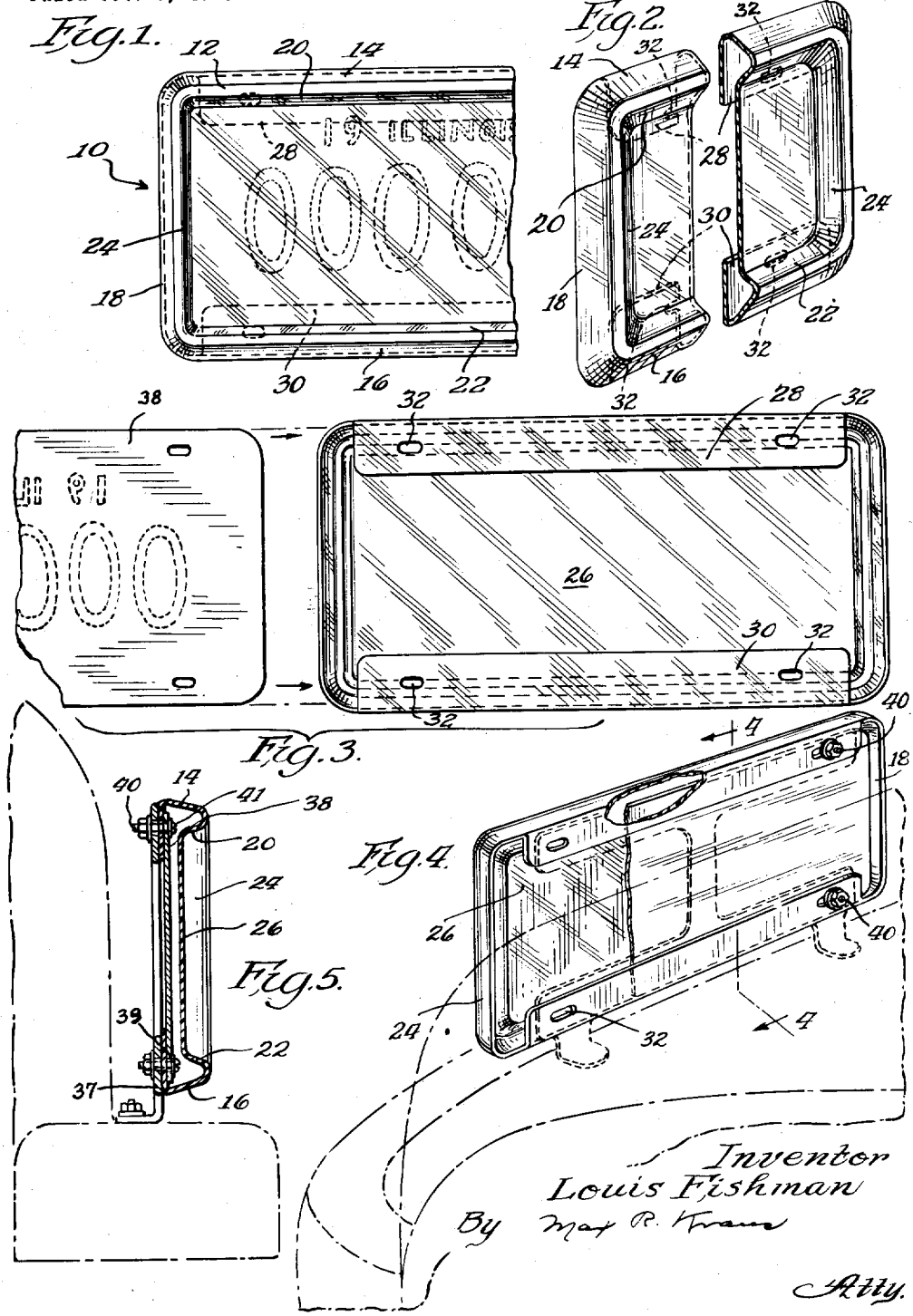

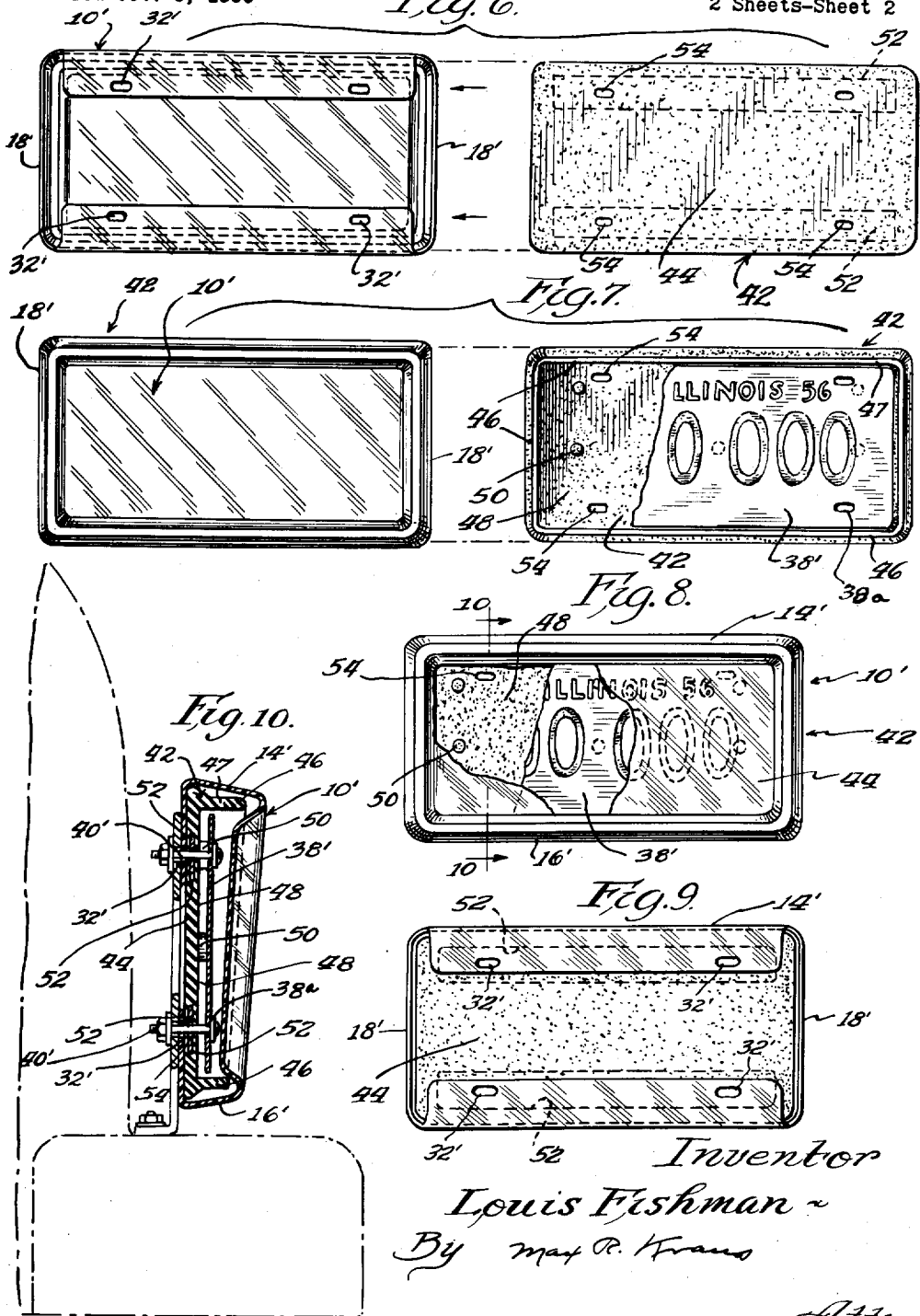

2,921,395

LICENSE PLATE HOLDER

Louis Fishman, Chicago, Ill.

Application October 8, 1956, Serial No. 614,739

3 Claims. (Cl. 40—209)

This invention relates to a license plate holder.

One of the objects of this invention is to provide a license plate holder which forms a protective covering for the license plate.

Another object is to provide a structure of the foregoing character which is molded of plastic material in one piece and which is economical to manufacture and easy to install.

Another object is to provide a license plate holder, which supports a supporting member made of resilient material and against which is nested the license plate.

Other objects will become apparent as this description progresses.

In the drawings:

Fig. 1 is a front elevational broken off view showing the holder of this invention supporting a license plate.

Fig. 2 is a broken perspective view partially in section showing the holder.

Fig. 3 is a rear view of the holder before inserting the license plate.

Fig. 4 is a rear perspective view of the holder and showing in phantom lines the manner of securing it to an automobile.

Fig. 5 is a cross sectional view taken on lines 4—4 of Fig. 4.

Fig. 6 is a rear elevational exploded view showing a modified holder with a supporting member.

Fig. 7 is a front elevational view of Fig. 6.

Fig. 8 is a front elevational view showing the supporting member and license plate in the holder.

Fig. 9 is a rear view of Fig. 8, and

Fig. 10 is a cross sectional view taken on lines 10—10 of Fig. 8.

The license plate holder shown in Figs. 1 to 5 inclusive, comprises a holder generally designated by the numeral 10 which is formed all in one piece of transparent plastic material. The holder is preferably made by the vacuum process, although it will be understood that any other method may be used.

The holder as previously stated is molded or formed of transparent material, as a one piece integral unit and comprises a rectangular shaped frame generally indicated at 12 having a top wall 14, a bottom wall 16 and side walls 18 which incline or slope inwardly towards the front. Continuing from said top, bottom and side walls and inclining inwardly and rearwardly are the top front border 20, the bottom front border 22 and the side front borders 24, all of which merge into the front vertical panel 26.

Formed as a continuation of the top wall 14 and extending downwardly thereof is a vertical section or flange 28, and formed as a continuation of the bottom wall 16 and extending upwardly thereof is a vertical section or flange 30. These flanges are provided with spaced openings or slots 32 to accommodate suitable fastening bolts.

Since the holder is made of transparent plastic material, it is advisable for ornamentation purposes to coat the inside of the top wall 14, bottom wall 16 and side walls 18, as well as the top front border 20, the bottom front border 22 and the side front borders 24 with an opaque material such as a paint in any suitable color, or same may be sprayed with an iridescent material, or with a glass tinsel.

The license plate generally designated by the numeral 38 is slid or inserted sidewise from either side and is positioned in front of the rear flanges 28 and 30 and behind the front vertical panel 26 of the holder. Fastening bolts 40 are passed through the slots 39 in the license plate and through the openings 32 in the flanges 28 and 30 and are secured to the bracket 37 provided on the motor vehicle for such purpose, the head 41 of the bolt 40 being positioned between the front panel 26 of the holder and the front of the license plate.

It will be seen that the license plate is securely held in the holder and that the license plate is enveloped by the holder with the front of the license plate covered by the transparent panel 26 to prevent any dirt, mud, or the like from contacting the front of the license plate. It provides a protective covering for the license plate.

The modification shown in Figs. 5 to 10 will now be described.

The holder for the modified form is substantially like that shown in the previous figures and will not be redescribed, except as to the differences. The holder designated by the numeral 10' is slightly larger in size than the holder 10 previously described. Also the top wall 14' of holder 10' has a greater depth than the bottom wall 16'. This provides the sides 18' with a greater depth at the top than at the bottom so that they incline or slant inwardly from the top towards the bottom as best shown in Fig. 10.

The holder 10' is adapted to support a support member generally indicated at 42 which is molded in one piece of rubber or some such resilient material.

The support member 42 is of rectangular shape and has a back panel 44 and a continuous peripheral ledge 46 extending around the top, bottom and sides thereof, to provide a recessed section 48 for receiving the license plate 38'. The top ledge indicated by the numeral 47 has a greater depth than the bottom ledge. The back panel is provided with spaced bosses 50 against which the license plate rests. Imbedded in the back panel are a pair of rigid metal horizontally positioned strips 52 which provide rigidity to said support member. When the support member 42 with the license plate is inserted in the holder 10, the peripheral ledge 46 will occupy the hollow space between the top, bottom and side walls of the holder and the respective top, bottom and sides of the border. Thus if the holder 10' is rammed or engaged by another vehicle or by an obstruction it will provide a sufficient give to prevent damage to the holder.

The support member 42 is provided with spaced openings 54 which align with the openings 38a in the license plate and the openings 32' in the flanges of the holder and through which passes a fastening bolt 40' for securing same to the support of a motor vehicle in the same manner as previously described.

It will be understood that various changes and modifications may be made from the foregoing without departing from the spirit and scope of the appended claims.

I claim:

1. A holder for a license plate, said holder comprising a single sheet of plastic material formed to provide an envelope, a support member formed of a resilient material and having a panel section and a peripheral ledge around said panel section to receive a license plate within said peripheral ledge, said envelope adapted to receive said support member and a license plate, said envelope having a transparent front through which the identification of said license plate is visible, said envelope extending rearwardly of said support member and having upper and lower vertically extending flanges formed as continuations of the front of said envolope, said flanges having openings to receive fastening elements whereby said envelope, support and license plate are secured to an attaching surface of a vehicle.

2. A holder for a license plate, said holder comprising a single sheet of plastic material formed to provide an envelope, said envelope having a front transparent panel and a border surrounding said panel, said border extending forwardly of said panel and providing a recessed wall portion around said panel, a support member formed of resilient material and having a panel section and a peripheral ledge around said panel section, said support adapted to be supported within said holder with the peripheral ledge thereof received within the recessed wall portion of the holder, said envelope extending rearwardly of said support and having upper and lower vertically extending flanges formed as continuations of the front of said envelope.

3. A holder for a license plate, said holder comprising a single sheet of plastic material formed to provide an envelope to receive and completely enclose the front of a license plate, said envelope having a top wall and a bottom wall sloping inwardly toward the front and a transparent front vertical wall joining said top and bottom walls through which the identification of said license plate is visible, said front vertical wall being positioned rearwardly of the front of said top and bottom walls, said sloping top and bottom walls defining an upper space between the top wall and the vertical wall and a lower space between the bottom wall and the vertical wall, said upper and lower spaces accommodating fastening elements, the rear of said top and bottom walls each having a vertically inwardly extending flange formed as a continuation of said walls and extending parallel to said transparent front vertical wall and in spaced relation thereto, said flange having openings to receive fastening elements whereby said envelope is secured to an attaching surface of a vehicle, said fastening elements extending into said envelope and into said upper and lower spaces and being enclosed by the front of said envelope so as to be inaccessible from the front of said envelope.

References Cited in the file of this patent

UNITED STATES PATENTS

| | | |
|---|---|---|
| 1,664,302 | Leopold et al. | Mar. 27, 1928 |
| 1,877,075 | Stephenson | Sept. 13, 1932 |
| 2,093,620 | Roessler | Sept. 21, 1937 |
| 2,361,479 | Joffo | Oct. 31, 1944 |
| 2,526,460 | Crocella | Oct. 17, 1950 |

FOREIGN PATENTS

| | | |
|---|---|---|
| 347,863 | Great Britain | May 7, 1931 |